US008549604B2

(12) United States Patent
Basson et al.

(10) Patent No.: US 8,549,604 B2
(45) Date of Patent: Oct. 1, 2013

(54) USER AUTHENTICATION METHOD AND SYSTEM

(75) Inventors: Sara H. Basson, White Plains, NY (US); Dimitri Kanevsky, Ossining, NY (US); Edward Emile Kelley, Wappingers Falls, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 12/408,757

(22) Filed: Mar. 23, 2009

(65) Prior Publication Data
US 2010/0242090 A1    Sep. 23, 2010

(51) Int. Cl.
G06F 7/04    (2006.01)

(52) U.S. Cl.
USPC .......... 726/9; 726/1; 726/2; 726/26; 713/172; 713/173; 713/174; 380/229; 705/65; 705/66; 705/67; 705/68; 705/69

(58) Field of Classification Search
USPC ............... 726/1–30; 380/229; 713/172–174; 705/65–69
See application file for complete search history.

(56) References Cited

U.S. PATENT DOCUMENTS

| 5,995,624 | A | 11/1999 | Fielder et al. |
| 6,401,066 | B1 | 6/2002 | McIntosh |
| 7,194,764 | B2 * | 3/2007 | Martherus et al. ............. 726/8 |
| 7,376,634 | B2 | 5/2008 | Liu et al. |
| 7,669,057 | B2 * | 2/2010 | Kelley et al. .................. 713/183 |
| 7,870,608 | B2 * | 1/2011 | Shraim et al. .................. 726/22 |
| 7,922,494 | B2 * | 4/2011 | Banerjee et al. ............. 434/323 |
| 2003/0217137 | A1 * | 11/2003 | Roese et al. .................. 709/223 |
| 2006/0026672 | A1 * | 2/2006 | Braun .............................. 726/9 |
| 2007/0214001 | A1 * | 9/2007 | Patron et al. ..................... 705/1 |
| 2010/0274799 | A1 * | 10/2010 | Lee et al. ..................... 707/769 |

OTHER PUBLICATIONS

Jakobsson et al.; Quantifying the Security of Preference-based Authentication; DIM '08, Oct. 31, 2008, Fairfax, Virginia, USA; pp. 61-69.
Zhu et al.; Dynamic Active Probing of Helpdesk Databases; PVLDB '08, Aug. 23-28, 2008, Auckland, New Zealand; pp. 748-760.

* cited by examiner

*Primary Examiner* — Edan Orgad
*Assistant Examiner* — Roderick Tolentino
(74) *Attorney, Agent, or Firm* — Schmeiser, Olsen & Watts; John Pivnichny (57) ABSTRACT

A user authentication method and system. A computing system receives from a user, a first request for accessing specified functions executed by a specified software application. The computing system enables a security manager software application and connects the specified software application to a computing apparatus. The computing system executes first security functions associated with the computing apparatus. The computing system executes second security functions associated with additional computing apparatuses. The computing system determines if the user may access the specified functions executed by the specified software application based on results of executing the first security functions and the second security functions. The computing system generates and stores a report indicating the results.

18 Claims, 3 Drawing Sheets

USER AUTHENTICATION METHOD AND SYSTEM

FIELD OF THE INVENTION

The present invention relates to a method and associated system for authenticating a user for access to specified functions executed by a software application.

BACKGROUND OF THE INVENTION

Providing access to a system typically comprises an inefficient process with little flexibility. Accordingly, there exists a need in the art to overcome the deficiencies and limitations described herein above.

SUMMARY OF THE INVENTION

The present invention provides a method, comprising:

receiving, by a computing system from a user, a first request for accessing first specified functions executed by a specified software application;

first enabling, by said computing system, a security manager software application;

connecting, by said computing system, said specified software application to a computing apparatus;

first executing, by said computing system in response to said first enabling, first security functions associated with said computing apparatus;

second executing, by said computing system in response to said first enabling, second security functions associated with additional computing apparatuses, wherein said computing apparatus is located within a specified distance of said additional computing apparatuses;

first determining, by a processor of said computing system, if said user may access said first specified functions executed by said specified software application, wherein said first determining is based on results of said first executing and said second executing;

generating, by said computing system, a report indicating said results; and storing, by said computing system, said report.

The present invention advantageously provides a system and associated method capable of providing access to a system.

DETAILED DESCRIPTION OF THE INVENTION

Figure 1:
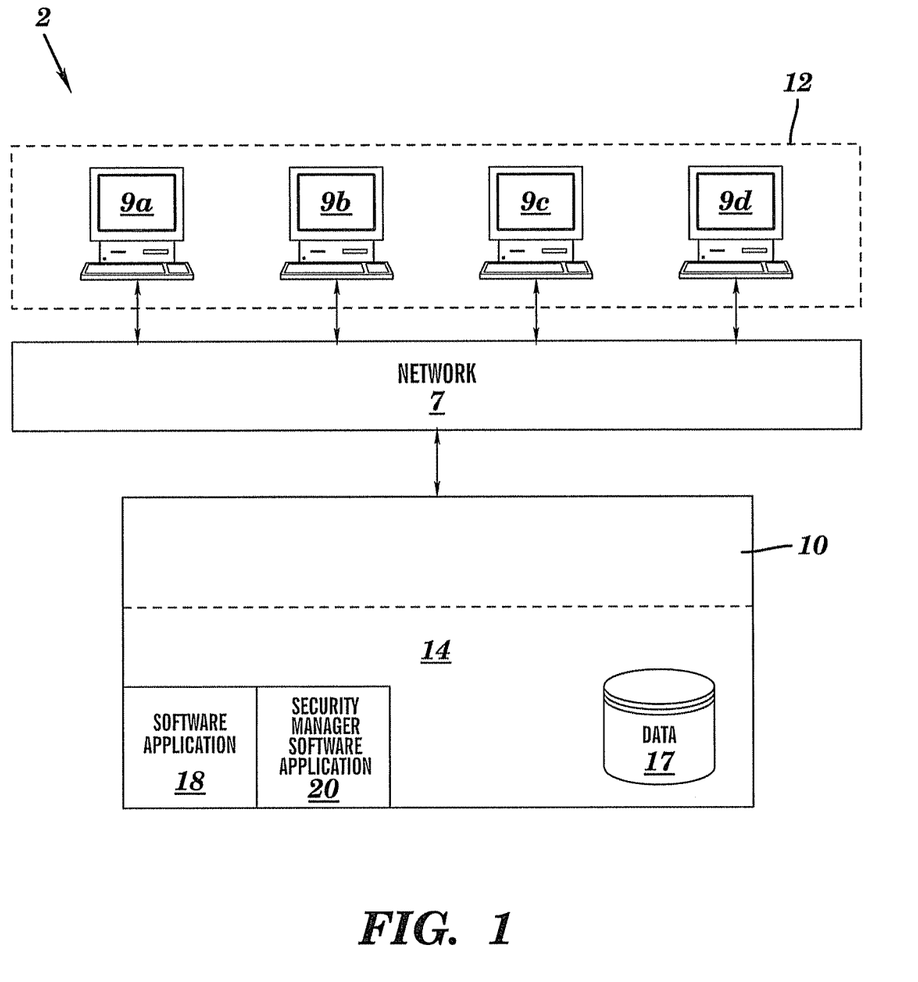
FIG. 1 illustrates a block diagram view of a system for authenticating a user to access specified functions executed by a software application, in accordance with embodiments of the present invention.

FIG. 1 illustrates a block diagram view of a system 2 for authenticating a user to access specified functions executed by a software application 18, in accordance with embodiments of the present invention. System 2 provides user authentication for access to online Internet activities (e.g., games, virtual worlds, Websites, online exams, etc) that require the user to exceed or precede a specified age. Additionally, system 2 performs a process for confirming the accuracy and truth of an individual's response to screening questions associated with a user's age, gender, occupation, education level, etc. As a first example, system 2 may request a user to submit his/her age for access to a specific Website and the user (e.g., a 10 year old child) replies that he/she is 25 years old. In response, system 2 presents (i.e., to the user) a random series of adult oriented questions (e.g., what year was the user born). The user is given a time limit to reply with an answer. If the user exceeds the time limit to reply, system 2 determines that the user may be calculating a birth year (i.e., for a 25 year old) rather than remembering his/her age. In this case (i.e., exceeded time limit), the user is denied access to the Website. As a second example, system 2 may request a user to submit his/her profession for access to a specific Website and the user replies that he/she is a mathematician. In response, system 2 presents (i.e., to the user) a random series of mathematical questions (e.g., what is a derivative, an integral, etc). The user is given a time limit to reply with an answer. If the user exceeds the time limit to reply, system 2 determines that the user may be attempting to locate an answer to the question (e.g., via the Internet, a book, etc) rather than actually knowing the answer. In this case (i.e., exceeded time limit), the user is denied access to the Website. The screening questions may comprise any type of question used to identify a user's age, gender, occupation, education level, etc.

System 2 performs the following functions associated with an authentication process:

1. System 2 generates age, occupation, gender specific questions for users of software applications and verifies user responses.

2. System 2 disables access to the Internet while the questions are being presented to the user so that Internet references (e.g., search engines, online dictionaries, etc) may not be used to access answers to the questions.

3. System 2 places (i.e., when a user begins to answer questions) a security token (e.g., a software token) on user's computer to temporarily disable Website access (e.g., by temporarily closing down a port used to access the Internet, by shutting down the user's browsers, by turning off all access to the Internet, etc).

System 2 comprises computing apparatuses 9a . . . 9d (e.g., user terminals) connected to a computing system 10 through a network 7. Network 7 may comprise any type of network such as, inter alia, a local area network, (LAN), a wide area network (WAN), the Internet, etc. Computing apparatuses 9a . . . 9d are located within a specified location 14. Specified location may comprise a house, a building (associated with a business), etc. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory device 14. Memory device 14 may comprise a single memory system. Alternatively, memory device 14 may comprise a plurality of memory systems. Memory device 14 may be internal to computing system 10 (e.g., as illustrated in FIG. 1) or external to computing system 10. Memory device 14 comprises a software application 18, a security manager software application 20, and a database 17. Alternatively, security manager software application 20 may be located in any of computing apparatuses 9a . . . 9d.

Security manager software application 20 performs the following functions associated a user authentication process for allowing access to specified functions executed by software application 18:

1. Security manager software application 20 receives a request (i.e., from a user using computing apparatus 9a) for access to specified functions executed by software application 18.
2. Security manager software application 20 generates screening questions (e.g., age related, occupation related, gender related, etc) and presents the screening questions to the user via computing apparatus 9a. Any combination of functions may be executed during the questioning process of step 2:
   A. Security manager software application 20 may temporarily block computing apparatus 9a from access or partial access (i.e., limit Website access) to the Internet so that Internet references may not be used to access answers to the screening questions. In order to continue to access security manager software application 20, while access to the Internet is temporarily blocked, synchronous communication may be established between security manager software application 20 and computing apparatus 9a. The synchronous communication allows the user to access security manager software application 20 with a screen transmitted back to computing apparatus 9a. Data entered on the screen will be transmitted as a transaction to the computing system 10. When the user begins to answer the screening questions, a software token may be placed on the computing apparatus 9a. The software token indicates that Web access will be blocked by: temporarily closing down a port used to access the Internet, shutting down the user's Web browsers, or by turning off access to the Internet. After the user answers the screening questions, the software token is removed and the Web browsers and ports are activated so that the user is allowed to access software application 18.
   B. Security manager software application 20 may temporarily block computing apparatuses 9b . . . 9d from access or partial access (i.e., limit Website access) to the Internet so that Internet references (i.e., on nearby computers) may not be used to access answers to the screening questions.
   C. Security manager software application 20 may implement time limits for receiving answers to the screening questions.
   D. Security manager software application 20 may identify and analyze various searches executed on any of computing apparatuses 9b . . . 9d in order to determine if information associated with the screening questions has been accessed.
3. Security manager software application 20 receives (i.e., from the user) answers to the screening questions and verifies an accuracy of the answers and the user is authorized to access software application 18.

Security manager software application 20 performs the following functions associated executing an online exam process in a controlled environment:

1. Security manager software application 20 receives and executes a request (i.e., from a user using computing apparatus 9a) for access to an online exam executed by software application 18.
2. Security manager software application 20 temporarily blocks computing apparatus 9a from access or partial access (i.e., limit Website access) to the Internet so that Internet references may not be used to access answers to the online exam. In order to continue to access the online exam (i.e., executed by software application 18), while access to the Internet is temporarily blocked, synchronous communication may be established between software application 18 and computing apparatus 9a. The synchronous communication allows the user to access software application 18 with a screen transmitted back to computing apparatus 9a. Data entered on the screen will be transmitted as a transaction to the computing system 10. When the user begins to answer the exam questions, a software token may be placed on the computing apparatus 9a. The software token indicates that Web access will be blocked by: temporarily closing down a port used to access the Internet, shutting down the user's Web browsers, or by turning off access to the Internet. After the user completes the exam questions, the software token is removed and the Web browsers and ports are activated so that the user may access the Internet in an unrestricted manner. Additionally, security manager software application 20 may temporarily block computing apparatuses 9b . . . 9d from access or partial access (i.e., limit Website access) to the Internet so that Internet references (i.e., on nearby computers) may not be used to access answers to the online exam.

The following implementation example illustrates a process used by computing system 10 for allowing access to a social networking Website (e.g., software application 18) that requires at least a minimum age (e.g., sixteen years old) for subscribers.

EXAMPLE

1. A user requests access to subscribe to social network Website A via computing apparatus 9a.
2. Security manager software application 20 is activated.
3. Security manager software application 20 determines (e.g., through a router) whether there are additional computers (e.g., computing apparatuses 9b . . . 9d) or communication devices within the user's vicinity.
4. If security manager software application 20 determines that there are additional computers within the user's vicinity, security manager software application 20 determines whether the additional computers may be monitored during inquiries.
5. Security manager software application 20 executes any combination of the following functions during the questioning process executed with respect to steps 6-12 as described, infra:
   A. Security manager software application 20 disables computing apparatus 9a from access to the internet.
   B. Security manager software application 20 disables computing apparatuses 9b . . . 9d from access to the internet.
   C. Security manager software application 20 monitors all computer activity executed on any of computing apparatuses 9a . . . 9d and determines whether there are any suspicious searches any of computing apparatuses 9a . . . 9d.
6. Security manager software application 20 initiates a (screening) questioning process. Screening questions presented to the user may include questions that users under 16 years old would be unlikely to know (e.g., questions about: LP records, VHS tapes, specific jargon or music that was popular 12 years ago, etc).
6. Security manager software application 20 determines if the user has answered the screening questions correctly.
7. If security manager software application 20 determines that the user has not answered the screening questions correctly then access to the social networking Website is denied.

8. If security manager software application 20 determines that the user has answered the screening questions correctly then any combination of the following functions may be executed:
   A. Security manager software application 20 determines if the user has answered the screening questions in a timely manner indicating that the answers were spontaneous and not researched.
   B. Security manager software application 20 determines if there was any correlated activity (e.g., Internet searches) executed on any of computing apparatuses 9a . . . 9d, thereby suggesting that the answers were researched via the Internet.
9. If security manager software application 20 determines that the user has answered the screening questions quickly and there was no correlated activity executed on any of computing apparatuses 9a . . . 9d, then access to the social networking Website is allowed.

Figure 2:
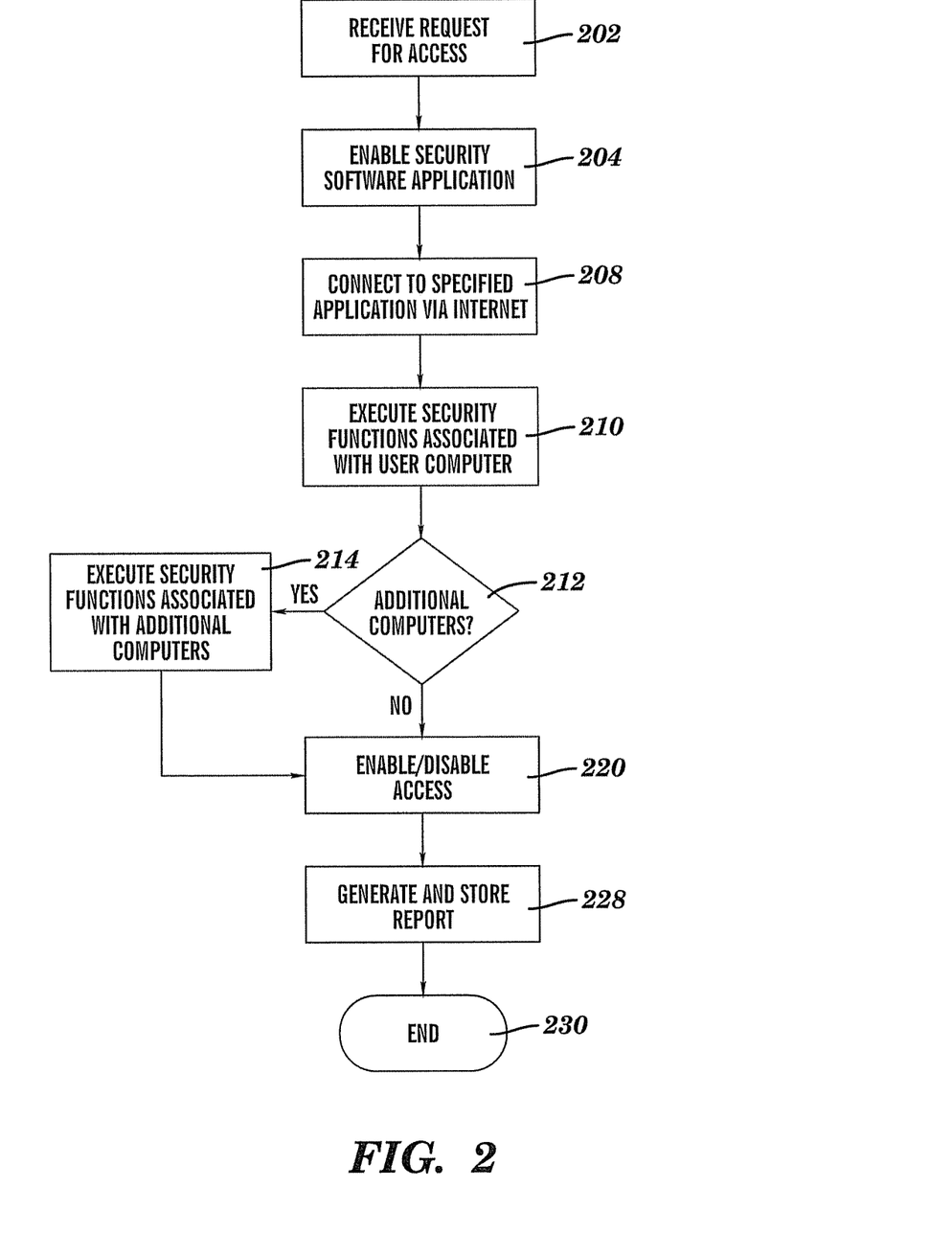
FIG. 2 illustrates an algorithm describing a process used by the system of FIG. 1 for authenticating a user to access specified functions executed by a software application, in accordance with embodiments of the present invention.

FIG. 2 illustrates an algorithm describing a process used by system 2 of FIG. 1 for authenticating a user to access specified functions executed by a software application, in accordance with embodiments of the present invention. In step 202, a computing system (e.g., computing system 10 of FIG. 1) receives (i.e., from a user) via a computing apparatus (e.g., computing apparatus 9a of FIG. 1) a request for accessing specified functions (e.g., social networking Website functions) executed by a software application (e.g., software application 18 of FIG. 1). In step 204, the computing system enables a security manager software application (e.g., security manager software application 20 of FIG. 1). In step 208, the computing system connects to the specified software application. In step 210, the computing system (in combination with the security manager software application) executes (i.e., in response to enabling the security manager software application) first security functions associated with the computing system. The first security functions may include generating screening questions (e.g., age related, occupation related, gender related, etc) and presenting the screening questions to the user via the computing apparatus. Additionally, any combination of the following functions may be executed during the screening questioning process:
1. The security manager software application may temporarily block the computing apparatus from access or partial access (i.e., limit Website access) to the Internet so that Internet references may not be used to access answers to the screening questions. In order to continue to access security manager software application, while access to the Internet is temporarily blocked, synchronous communication may be established between the security the manager software application and the computing apparatus. When the user begins to answer the screening questions, a software token may be placed on the computing apparatus. The software token indicates that Web access will be blocked by: temporarily closing down a port used to access the Internet, shutting down the user's Web browsers, or by turning off access to the Internet.
2. The security manager software application may implement time limits for receiving answers to the screening questions.
3. The security manager software application may monitor all activity executed on the computing apparatus (e.g., Web searches) and determines whether there are any suspicious searches on the computing apparatus.

In step 212, the computing system (e.g., through a router) determines if there are additional computing apparatuses (e.g., computing apparatuses 9b . . . 9d in FIG. 1) or communication devices within the user's vicinity.

If in step 212, the security manager software application determines that there are additional computing apparatuses within the user's vicinity, then in step 214, the security manager software application executes (i.e., in response to enabling the security manager software application) second security functions associated with the additional computing apparatuses and step 220 is executed as described, infra. Any combination of the following functions may be executed (in step 214) with respect to the additional computing apparatuses during the screening questioning process of step 210:
1. The security manager software application disables the additional computing apparatuses from access to the internet.
2. The security manager software application monitors all computer activity executed on any of the additional computing apparatuses and determines whether there are any suspicious searches any of the additional computing apparatuses.

If in step 212, the security manager software application determines that there are additional computing apparatuses within the user's vicinity, then step 220 is executed.

In step 220, the computing system (in combination with the security manager software application) enables or disables (i.e., based on results of the first security functions and/or the second security functions) access to specified functions executed by the software application. In step 228, the computing system generates and stores a report indicating the results of the first security functions and/or the second security functions and the process is terminated in step 230.

Figure 3:
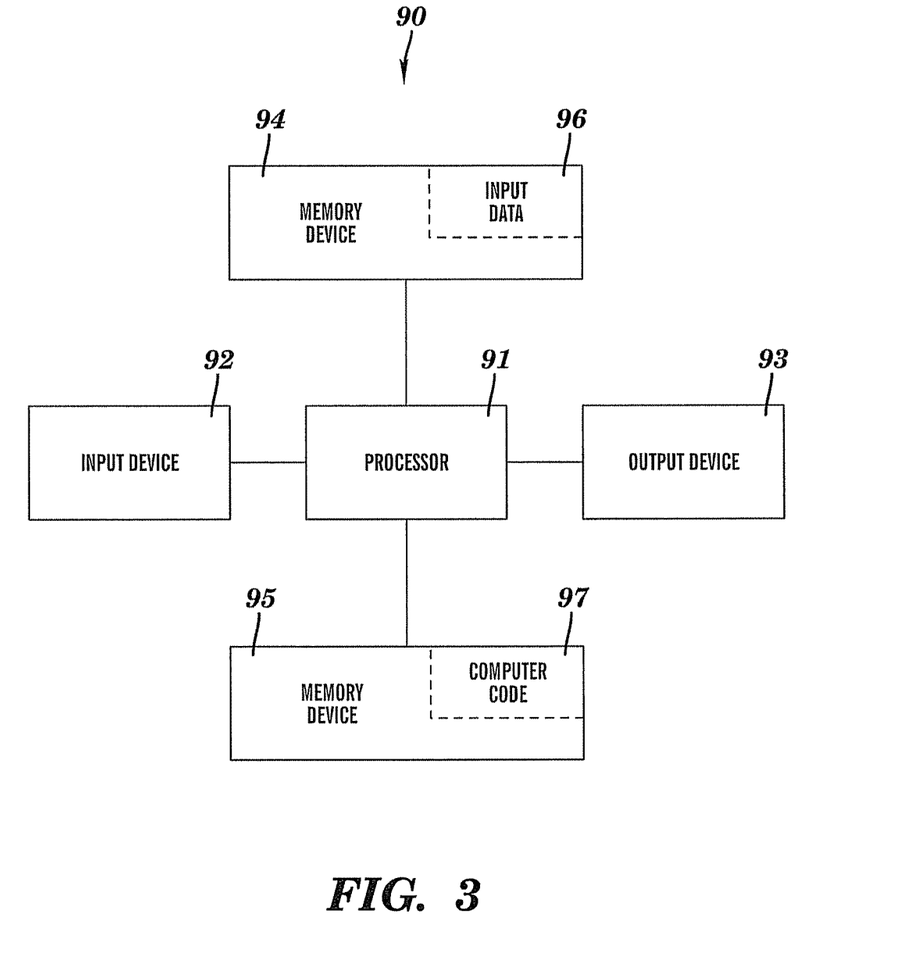
FIG. 3 illustrates a computer system used by the system of FIG. 1 for authenticating a user to access specified functions executed by a software application, in accordance with embodiments of the present invention.

FIG. 3 illustrates a computer system 90 (e.g., computing system 10 in FIG. 1) used for authenticating a user to access specified functions executed by a software application, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for authenticating a user to access specified functions executed by a software application (e.g., the algorithm of FIG. 2). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to authenticate a user to access specified functions executed by a software application. Thus the present invention discloses a process for deploying or integrating computing infrastructure, comprising integrating computer-readable code into the computer system 90, wherein the code in combination with the computer system 90 is capable of performing a method for authenticating a user to access specified functions executed by a software application. In another embodiment, the invention provides a business method that performs the process steps of the invention on a subscription, advertising, and/or fee basis. That is, a service provider, such as a Solution Integrator, could offer to authenticate a user to access specified functions executed by a software application. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
receiving, by a computing system from a user, a first request for accessing first specified functions executed by a specified software application;
first enabling, by said computing system, a security manager software application;
connecting, by said computing system, said specified software application to a computing apparatus;
first executing, by said computing system in response to said first enabling, first security functions associated with said computing apparatus, wherein said first executing comprises:
presenting, by said computing system to said user, a request for submitting an age and occupation of said user;
receiving, by said computing system from said user, data indicating said age and occupation of said user;
temporarily blocking, by said computing system executing a security token, said user from accessing the Internet using said computing apparatus;
presenting, by said computing system to said user, first specified questions associated with knowledge possessed by an individual that comprises a similar age and occupation to said age and occupation of said user;
receiving, by said computing system from said user, answers to said specified questions;
second determining, by said computing system, if said answers are associated with a first predetermined set of answers associated with said knowledge;
determining, by said computing system, time periods between said presenting each of said first specified questions and said receiving each of said answers;
comparing, by said computing system, each time period of said time periods to a predetermined time period;
determining, by said computing system, if any of said time periods exceed said predetermined time period; and
generating, by said computing system, results of said comparing and results of said determining if any of said time periods exceed said predetermined time period;
additionally determining, by said computing system, that said computing apparatus is located within a specified distance of additional computing apparatuses, wherein said specified distance comprises a distance allowing said user to physically access said additional computing apparatuses for accessing the Internet for retrieving said answers;
second executing, by said computing system in response to said first executing and results of said additionally determining, second security functions associated with an Internet connection of said additional computing apparatuses;
first determining, by a processor of said computing system, if said user may access said first specified functions executed by said specified software application, wherein said first determining is based on results of said first executing and said second executing and said results of said comparing;
generating, by said computing system, a report indicating said results of said first executing and said second executing; and
storing, by said computing system, said report.

2. The method of claim 1, wherein said first specified questions are associated with a gender of said user.

3. The method of claim 1, wherein said second determining determines that said answers are associated with said first predetermined set of answers, wherein said first determining determines that said user may access said first specified functions executed by said specified software application, and wherein said method further comprises:
second enabling, by said computing system for said user, access to said first specified functions executed by said specified software application.

4. The method of claim 1, wherein said computing system is connected to said specified software application through the Internet, and wherein said method further comprises:
allowing, by said computing system, said user to only access said specified software application through the Internet.

5. The method of claim 1, wherein said second determining determines that said answers are not associated with said first predetermined set of answers, wherein said first determining determines that said user may not access said first specified functions executed by said specified software application, and wherein said method further comprises:
disabling, by said computing system, access to said first specified functions executed by said specified software application.

6. The method of claim 1, wherein said second executing comprises:
blocking, by said computing system, said additional computing apparatuses from accessing the Internet.

7. The method of claim 6, wherein said second determining determines that said answers are associated with said first predetermined set of answers, wherein said first determining determines that said user may access said first specified functions executed by said specified software application, and wherein said method further comprises:
second enabling, by said computing system for said user, access to said first specified functions executed by said specified software application.

8. The method of claim 6, wherein said second determining determines that said answers are not associated with said first predetermined set of answers, wherein said first determining determines that said user may not access said first specified functions executed by said specified software application, and wherein said method further comprises:

disabling, by said computing system, access to said first specified functions executed by said specified software application.

9. The method of claim 1, wherein said second executing comprises:

monitoring, by said computing system, information retrieved through the Internet by said additional computing apparatuses; and third determining, by said computing system, if said information is associated with said first specified questions.

10. The method of claim 9, wherein said third determining determines that said information is not associated with said first specified questions, wherein said second determining determines that said answers are associated with said first predetermined set of answers, wherein said first determining determines that said user may access said first specified functions executed by said specified software application, and wherein said method further comprises:

second enabling, by said computing system for said user, access to said first specified functions executed by said specified software application.

11. The method of claim 9, wherein said third determining determines that said information is associated with said first specified questions, wherein said second determining determines that said answers are not associated with said first predetermined set of answers, wherein said first determining determines that said user may not access said first specified functions executed by said specified software application, and wherein said method further comprises:

disabling, by said computing system, access to said first specified functions executed by said specified software application.

12. The method of claim 1, wherein said results of said comparing indicate that said time period exceeds said predetermined time period, and wherein said method further comprises:

disabling, by said computing system, access to said first specified functions executed by said specified software application.

13. The method of claim 1, wherein said results of said comparing indicate that said predetermined time period exceeds said time period, and wherein said method further comprises:

third determining, by said computing system, if said answers are associated with said first predetermined set of answers.

14. The method of claim 13, wherein said third determining determines that said answers are associated with said first predetermined set of answers, wherein said first determining determines that said user may access said first specified functions executed by said specified software application, and wherein said method further comprises:

second enabling, by said computing system for said user, access to said first specified functions executed by said specified software application.

15. The method of claim 13, wherein said third determining determines that said answers are not associated with said first predetermined set of answers, wherein said first determining determines that said user may not access said first specified functions executed by said specified software application, and wherein said method further comprises:

disabling, by said computing system, access to said first specified functions executed by said specified software application.

16. A process for supporting computer infrastructure, said process comprising providing at least one support service for at least one of creating, integrating, hosting, maintaining, and deploying computer-readable code in a computing system, wherein the code in combination with the computing system is capable of performing a method upon being executed by a computer processor of the computing system, said method comprising:

receiving, by said computing system from a user, a first request for accessing first specified functions executed by a specified software application;

first enabling, by said computer processor, a security manager software application;

connecting, by said computing system, said specified software application to a computing apparatus;

first executing, by said computing system in response to said first enabling, first security functions associated with said computing apparatus, wherein said first executing comprises:

presenting, by said computing system to said user, a request for submitting an age and occupation of said user;

receiving, by said computing system from said user, data indicating said age and occupation of said user;

temporarily blocking, by said computing system executing a security token, said user from accessing the Internet using said computing apparatus;

presenting, by said computing system to said user, first specified questions associated with knowledge possessed by an individual that comprises a similar age and occupation to said age and occupation of said user;

receiving, by said computing system from said user, answers to said specified questions;

second determining, by said computing system, if said answers are associated with a first predetermined set of answers associated with said knowledge;

determining, by said computing system, time periods between said presenting each of said first specified questions and said receiving each of said answers;

comparing, by said computing system, each time period of said time periods to a predetermined time period;

determining, by said computing system, if any of said time periods exceed said predetermined time period; and generating, by said computing system, results of said comparing and results of said determining if any of said time periods exceed said predetermined time period;

additionally determining, by said computing system, that said computing apparatus is located within a specified distance of additional computing apparatuses, wherein said specified distance comprises a distance allowing said user to physically access said additional computing apparatuses for accessing the Internet for retrieving said answers;

second executing, by said computing system in response to said first executing and results of said additionally determining, second security functions associated with an Internet connection of said additional computing apparatuses;

first determining, by a processor of said computing system, if said user may access said first specified functions executed by said specified software application, wherein said first determining is based on results of said first executing and said second executing and said results of said comparing;

generating, by said computing system, a report indicating said results of said first executing and said second executing; and storing, by said computing system, said report.

17. A computer program product, comprising a computer readable storage device storing a computer readable program code, said computer readable program code configured to perform a method upon being executed by a computer processor of a computing system, said method comprising:

receiving, by said computing system from a user, a first request for accessing first specified functions executed by a specified software application;

first enabling, by said computer processor, a security manager software application;

connecting, by said computing system, said specified software application to a computing apparatus;

first executing, by said computing system in response to said first enabling, first security functions associated with said computing apparatus, wherein said first executing comprises:

presenting, by said computing system to said user, a request for submitting an age and occupation of said user;

receiving, by said computing system from said user, data indicating said age and occupation of said user;

temporarily blocking, by said computing system executing a security token, said user from accessing the Internet using said computing apparatus;

presenting, by said computing system to said user, first specified questions associated with knowledge possessed by an individual that comprises a similar age and occupation to said age and occupation of said user;

receiving, by said computing system from said user, answers to said specified questions;

second determining, by said computing system, if said answers are associated with a first predetermined set of answers associated with said knowledge;

determining, by said computing system, time periods between said presenting each of said first specified questions and said receiving each of said answers;

comparing, by said computing system, each time period of said time periods to a predetermined time period;

determining, by said computing system, if any of said time periods exceed said predetermined time period; and generating, by said computing system, results of said comparing and results of said determining if any of said time periods exceed said predetermined time period;

additionally determining, by said computing system, that said computing apparatus is located within a specified distance of additional computing apparatuses, wherein said specified distance comprises a distance allowing said user to physically access said additional computing apparatuses for accessing the Internet for retrieving said answers;

second executing, by said computing system in response to said first executing and results of said additionally determining, second security functions associated with an Internet connection of said additional computing apparatuses;

first determining, by a processor of said computing system, if said user may access said first specified functions executed by said specified software application, wherein said first determining is based on results of said first executing and said second executing and said results of said comparing;

generating, by said computing system, a report indicating said results of said first executing and said second executing; and storing, by said computing system, said report.

18. A computing system comprising a processor coupled to a computer-readable memory unit, said memory unit comprising a computer readable code that when executed by a computer processor implements a method comprising:

receiving, by said computing system from a user, a first request for accessing first specified functions executed by a specified software application;

first enabling, by said computer processor, a security manager software application;

connecting, by said computing system, said specified software application to a computing apparatus;

first executing, by said computing system in response to said first enabling, first security functions associated with said computing apparatus, wherein said first executing comprises:

presenting, by said computing system to said user, a request for submitting an age and occupation of said user;

receiving, by said computing system from said user, data indicating said age and occupation of said user;

temporarily blocking, by said computing system executing a security token, said user from accessing the Internet using said computing apparatus;

presenting, by said computing system to said user, first specified questions associated with knowledge possessed by an individual that comprises a similar age and occupation to said age and occupation of said user;

receiving, by said computing system from said user, answers to said specified questions;

second determining, by said computing system, if said answers are associated with a first predetermined set of answers associated with said knowledge;

determining, by said computing system, time periods between said presenting each of said first specified questions and said receiving each of said answers;

comparing, by said computing system, each time period of said time periods to a predetermined time period;

determining, by said computing system, if any of said time periods exceed said predetermined time period; and generating, by said computing system, results of said comparing and results of said determining if any of said time periods exceed said predetermined time period;

additionally determining, by said computing system, that said computing apparatus is located within a specified distance of additional computing apparatuses, wherein said specified distance comprises a distance allowing said user to physically access said additional computing apparatuses for accessing the Internet for retrieving said answers;

second executing, by said computing system in response to said first executing and results of said additionally determining, second security functions associated with an Internet connection of said additional computing apparatuses;

first determining, by a processor of said computing system, if said user may access said first specified functions executed by said specified software application, wherein said first determining is based on results of said first executing and said second executing and said results of said comparing;
generating, by said computing system, a report indicating said results of said first executing and said second executing; and
storing, by said computing system, said report.

* * * * *